July 12, 1966 M. E. HARDY 3,260,528

PORTABLE PHONOGRAPHS

Filed Aug. 23, 1963

INVENTOR.
Maurice E. Hardy
BY John J. Pederson
Atty.

United States Patent Office 3,260,528
Patented July 12, 1966

3,260,528
PORTABLE PHONOGRAPHS

Maurice E. Hardy, Evanston, Ill., assignor to Zenith Radio Corporation, Chicago, Ill., a corporation of Delaware Filed Aug. 23, 1963, Ser. No. 304,116
3 Claims. (Cl. 274—1)

Figures 1, 1A:
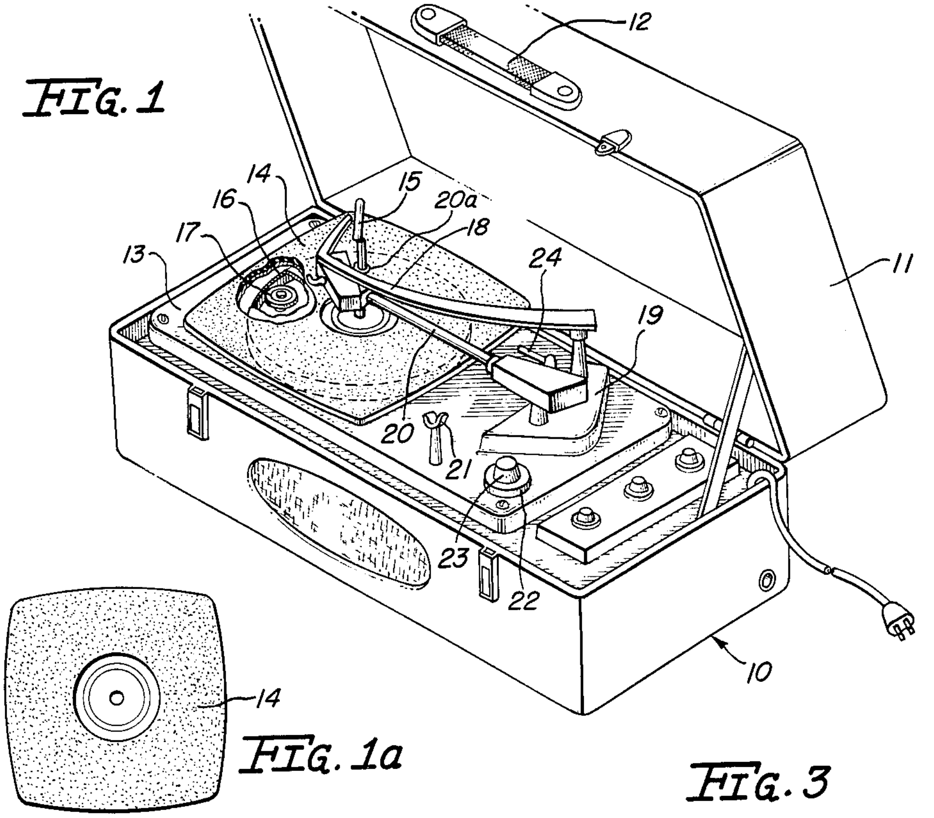

The present invention is directed to phonographs and concerns most particularly structural features which are specially beneficial in the construction of phonographs of reduced physical size. With the popularity of portable phonograph and record changing mechanisms, it has become increasingly important to minimize overall cabinet dimensions both for convenience in carrying the instrument and in reducing its weight.

Heretofore, a limiting factor in determining the overall dimensions of the cabinet housing the instrument has been the turntable itself. The turntable usually is a circular plate having a diameter which preferably closely approaches the diameter of the largest size record disc to be played. If the turntable diameter is at least equal to that of the record disc, maximum support for the disc is obtained but also this leads to undesirably large overall dimensions for the instrument. Some relief has been obtained by reducing the turntable diameter so that it is somewhat less than that of the largest record disc to be played.

Although this permits some reduction in physical size, it is still desirable to further minimize the space requirement particularly of the turntable. Other expedients that have been proposed, but not used commercially as far as applicant is aware, contemplate that the turntable have a family of components mounted to a support and movable from an inoperative to an operative position. In the inoperative position, the components by folding into the principal member or otherwise nesting with respect to one another, take a very small amount of space and they are fanned out, so to speak, in order to render the turntable operative. That is to say, the movable elements are displaced radially outwardly with respect to the center of a principal support to provide bearing surfaces upon which the peripheral portions of the record disc may rest. Indeed, such an approach permits the turntable to have a minimal size when not in use but it has the complication of a relatively large number of components which must be mounted for relative movement and imposes on the user the need to manipulate the parts of the turntable before the instrument may be used in playing records.

Accordingly, it is an object of the invention to provide a phonograph which avoids one or more of the aforementioned limitations of prior devices.

It is a more particular object of the invention to provide a novel phonograph structure which has reduced overall physical dimensions.

A subsidiary object of the invention is to provide a novel turntable construction which facilitates reducing the size and weight of a phonograph instrument.

A compact portable phonograph constructed in accordance with the invention comprises a lower cabinet section having predetermined interior length and width dimensions and a rectangular upper cabinet section, at least partially removable from the lower section, having interior dimensions for mating with the lower section. There is a rectangular mounting plate for supporting components of the phonograph and this plate is affixed to the cabinet and has characteristic dimensions approximately equal to the internal dimensions of the cabinet. A rotatable turntable is supported on the mounting plate above the lower cabinet section and comprises a non-circular but symmetrical unitary plate. The turntable has a centrally located aperture for receiving a record spindle and it has two principal orthogonally related characteristic dimensions, one of the characteristic dimensions being greater than one of the interior dimensions of the upper cabinet section and the other of the characteristic dimensions being approximately equal to the smaller interior dimension of the upper cabinet section for permitting location of the turntable entirely within the confines of the upper cabinet section at a predetermined rotational position of the turntable.

In a preferred embodiment of the invention, the turntable is essentially square in configuration with length and width dimensions approximately equal to the width of the mounting plate upon which the turntable is rotatably supported.

Figure 3:
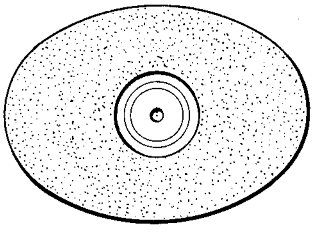
Figure 4:
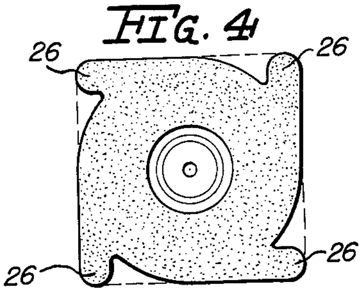
Figure 2:
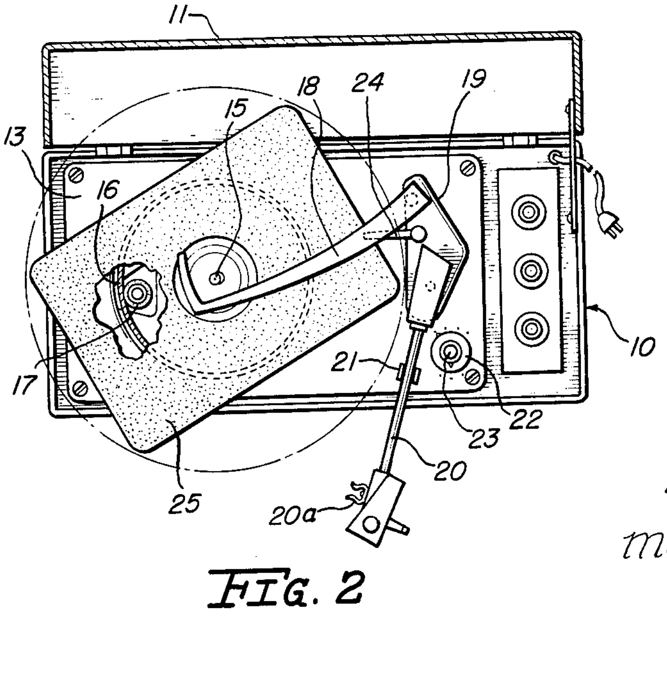

For a better understanding, the features of the present invention which are believed to be novel are set forth with particularity in the appended claims. The invention, together with further objects and advantages thereof, may best be understood by reference to the following description taken in connection with the accompanying drawing, in the several figures of which like reference numerals identify like elements, and in which:

FIGURE 1 is a perspective view of a phonograph incorporating the present invention;

FIGURE 1*a* is a plan view of the turntable employed in the phonograph shown in FIGURE 1;

FIGURE 2 is a plan view of a phonograph having an alternative turntable structure in accordance with the invention; and FIGURES 3 and 4 are plan views of other forms of turntable structures that may be used in the instruments of FIGURES 1 or 2.

Referring now more particularly to FIGURE 1 the arrangement there represented is a portable phonograph incorporating an automatic record changer. The instrument has a two-part housing or cabinet with a base portion 10 which houses the major components of the instrument such as the record changing mechanism, amplifier and one or more loud speakers, although if the instrument is for stereophonic reproduction it may be provided with jacks or other facilities to accommodate remote speakers which may be cable-connected to the output of the amplifier. The cabinet is rectangular in cross section and, for convenience in establishing a reference, may be said to have maximum length and width dimensions. The cover 11 may be hinged permanently or removably to the base and the instrument is arranged to have minimal overall physical dimensions. A handle 12 is secured to the cabinet for ease in transporting the instrument.

A mounting plate 13 is affixed to the cabinet. This plate is provided for supporting the components, especially the mechanical components of the instrument, and has characteristic dimensions less than those of the cabinet. Preferably, the plate is rectangular to conform in configuration to the cross section of the cabinet and these overall dimensions are just slightly less than the internal cabinet dimensions. Mounting screws in the assembly, which may be provided, permit fastening mounting plate 13 rigidly within the cabinet when the instrument is being transported, and yet may be released to achieve a floating support for the mounting plate when the phonograph is being used. This is the conventional practice for portable phonographs and the mounting structure which forms no part of the present invention has not been shown in the drawing in order to simplify the representation.

In accordance with the invention, one of the principal components supported on the upper surface of mounting plate 13 is a turnable 14 of unique configuration. Specifically, it is a non-circular but symmetrical unitary plate having a centrally located aperture for receiving a record spindle 15. It has two principal orthogonally related characteristic dimensions, namely its length and width, which are both approximately equal to the inside width of the cabinet. Preferably, the turntable is square, as shown in the plan view of FIGURE 1*a*, with length and width dimensions about equal to the width of the mounting plate. The turntable is a planar structure and may have as its upper surface a material which has a sufficiently high co-efficient of friction to assure a sufficient drive for a record disc placed on the turntable for playing the record disc's transcription. It is convenient, for example, to have a mat of rubber or the like to constitute the top surface of the turntable. A depending circular driving flange 16 concentric with the turntable is affixed, preferably by riveting, on the underside of the turntable plate to receive a drive wheel 17. Flange 16 is, in diameter, less than either of the equal principal orthogonal dimensions of the turntable, yet greater than half such dimension. The drive wheel and the remainder of the driving mechanism may be of entirely conventional construction.

The mechanical and operating details of the record changer are completely conventional and constitute no part of the present invention. It, therefore, has not been deemed necessary to show any more of that structure than appears upon observation of the phonograph with the cover open. The structure comprises spindle 15 which projects through the central aperture of turntable 14. This spindle is of the storing and record feeding type with a shelf section near its upper extremity upon which a stack of records, threaded over the free end of the spindle, rests, waiting to be fed one at a time to the turntable. The spindle is hollow and includes an ejector and a port through which the ejector has access to the spindle aperture of the lowermost record in the stack to displace that particular record off the shoulder in order that it may drop to the turntable during the record changing cycle.

A pressure arm 18 pivotally supported from a stanchion 19 bears on the uppermost record of the stack to retain them in position on the spindle shelf. There is the customary tone arm 20 which is supported for pivotal motion in both horizontal and vertical planes from structures that are also accommodated by stanchion 19. When the phonograph is at rest, although in condition to play records, the tone arm is supported on a rest post 21. In accordance with another feature of the invention, means are provided for releasably securing tone arm 20 to the record rotating and indexing means comprising turntable 14 and spindle 15, in a position within the confines of cabinet 10 and clear of turntable 14. To this end, a spring clip **20*a* adapted to latch onto spindle 15 is affixed to tone arm 20 at a distance from its vertical pivot equal to that between spindle 15** and the vertical pivot.

There are the customary controls on the mounting plate; for speed selection, and for turning the record changer on and off and for instituting the record changer cycle. These are shown as concentrically arranged knobs with the outer knob 22 the speed selector control, and the inner knob 23 serving to turn the changer on and off and to control record changing as well as rejecting.

The other element 24 which projects upwardly from mounting plate 13 is the flag or sensing device that conditions the record changer and its control of the tone arm in accordance with the diameter of the record that is to be played.

The record-changing mechanism operates in conventional fashion. In operation, pressure arm 18 is swung in a counterclockwise direction to its extreme position which gives free access to the spindle in order that a stack of records may be threaded thereover and placed upon the shelf of spindle 15. Thereafter, the pressure arm is returned to the position shown over and bearing upon the uppermost record to stabilize the record stack.

If control knob 22 is suitably adjusted to the proper speed, and control knob 23 is manipulated, the record changer is turned on and a record change cycle is initiated. This results in the lowermost record of the stack being delivered to the turntable, after which tone arm 20 is set down in the first or lead-in groove of the record, and the reproduction of the record disc's transcription takes place in the usual way. After the record has been played, the tone arm returns to its rest position and the second record change cycle is instituted. This procedure is repeated until all records of the stack have been played; the instrument is usually provided with an automatic shut-off mechanism as is well known in the art.

A particular advantage of the described instrument with the unusual feature of a square turntable, in accordance with the present invention, is that the turntable no longer constitutes the limiting factor in determining the width dimension of the cabinet. The turntable disclosed is of a very reduced size and yet provides four symmetrically positioned areas of support to engage the record near its outer periphery. These four sections, of course, are the corners of the turntable.

To achieve the greatest advantages of the invention while providing adequate support for the record discs while being played, the length and width dimensions of the turntable should be approximately equal to two-thirds of the record disc diameter. In the preferred embodiment, the turntable is approximately 7½ inches square; hence the dimension at the diagonal is about 9¼ inches which has proven adequate even for the support of 12 inch record discs.

Wow or variation in turntable speed is one of the most undesirable and annoying types of distortion in record disc sound reproduction. When the speed of the turntable varies from the desired speed, the frequency of the sound reproduction varies correspondingly, producing an extraneous beat, wobble, or wow in the sound reproduction. This effect is heard through the entire reproduced frequency range and particularly detracts from song and music reproduction, the most popular uses of record disc sound reproduction. It has been found that by employing a circular driving flange 16 of a diameter greater than one-half the turntable width but less than the entire width, a much lesser amount of wow is encountered than in other types of reduced-size turntable constructions which require an axial driving system.

With conventional round turntable constructions, the trend has been to the use of heavier turntables, with their greater flywheel effect, and turntables weighing 26 ounces or more have been considered essential to hold wow and flutter at an acceptably low level for high fidelity sound reproduction. The square turntable of the present invention has been found to be especially advantageous from this point of view also; despite its departure from full circular symmetry, wow and flutter distortions from the square turntable are at a level which is comparably low with that achieved by employing conventional circular turntable weighing up to fifty percent more. In the preferred embodiment with a 7½ inch square record supporting surface, the diameter of depending circular driving flange 16 is most advantageously between six and seven inches, and a turntable weight of only 17½ ounces have been found entirely acceptable for use in high fidelity portable or console record playing instruments.

As will be observed, with the illustrated compact construction, tone arm 20 overhangs the cabinet edge when resting in post 21. When it is desired to close or transport the phonograph, the tone arm is manually pivoted inwardly until spring clip **20*a* latches to spindle 15, thus releasably securing the tone arm in a position within the confines of cabinet 10. By accurately positioning the spring clip 20*a* at a distance from the tone arm vertical pivot equal to that between spindle 15 and the vertical pivot of the tone arm, it is assured that when the tone arm is latched in its storage position, tone arm 20 and its components including the record tracking stylus are supported in a position clear of turntable 14**, as illustrated in FIGURE 1.

While the turntable of an essential square shape is preferred, the invention is not restricted to that specific shape. FIGURE 2 shows a plan view of a phonograph similar to that of FIGURE 1, differing only in that it comprises a turntable 25 which is essentially rectangular in shape with a width dimension approximately equal to the cabinet width, but a length which exceeds the width although it is substantially less than the length dimension of he cabinet and mounting plate. By rounding the narrow sides of such a rectangular turntable, it tends to degenerate into a elliptical surface as shown in FIGURE 3. Alternatively, the turntable may be formed as a modified circular structure having projecting fingers 26 as shown in FIGURE 4. The fingers 26 are symmetrically located and the overall length and width dimensions of the turntable, as represented by the broken construction lines, may be equal, or the length dimension may exceed the width dimension.

While the invention has been shown and described in connection with a phonograph having a cabinet of substantially reduced width dimension, the beneficial result of a reduction in physical size of the phonograph cabinet is not restricted to this mode. An equivalent reduction in cabinet height or length may be achieved, if desired, depending upon the orientation of the record player in the cabinet.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. A compact portable phonograph comprising:
a lower cabinet section rectangular in cross-section and having predetermined interior length and width dimensions;
a rectangular upper cabinet section, at least partially removable from said lower section, having interior dimensions for mating with said lower section;
a rectangular mounting plate for supporting components of said phonograph, having characteristic dimensions approximately equal to the internal dimensions of said lower cabinet section and affixed thereto;
and a rotatable turntable, having a record mounting surface and supported by said mounting plate above said lower cabinet section, comprising a non-circular but symmetrical unitary plate having a centrally located aperture receiving a record spindle and having one transverse dimension of said record mounting surface greater than the smaller of said interior dimensions of said upper cabinet section and having a second transverse dimension of said record mounting surface approximately equal to but less than said smaller interior dimension of said upper cabinet section for permitting location of said turntable entirely within the confines of said upper cabinet section only at certain predetermined rotational positions of said turntable.

2. A compact portable phonograph comprising:
a cabinet rectangular in cross-section and having predetermined length and width dimensions;
a rectangular mounting plate for supporting components of said phonograph, having characteristic dimensions approximately equal to the internal dimensions of said cabinet, and affixed to said cabinet;
a turntable supported by said mounting plate above said base and comprising a rectangular unitary plate provided with a centrally located aperture for receiving a record spindle and having a width dimension substantially equal to said cabinet width and a length dimension greater than said cabinet width dimension, said turntable further comprising a depending circular flange concentric with said aperture and having a diameter less than the width dimension of said plate but greater than one-half said width dimension of said plate;
and means including a drive wheel adapted to engage said flange for driving said turntable.

3. A compact portable phonograph for the playing of a record disc comprising:
a cabinet base having predetermined interior length and width dimensions;
a cabinet top having dimensions for mating with said cabinet base;
a mounting plate for supporting components of said phonograph having characteristic maximum dimensions approximately equal to the interior dimensions of said cabinet base and affixed upon said cabinet base;
record rotating and indexing means including a rotatable turntable supported by said mounting plate above said cabinet base comprising a non-circular but symmetrical unitary plate having two principal orthogonally related characteristic dimensions one of which is approximately equal to and the other of which is greater than said cabinet base width dimension for permitting location of said turntable entirely within the confines of said cabinet top only at certain predetermined rotational positions of said turntable, and a record-indexing spindle at the center of said turntable;
a tone arm pivotally mounted to said mounting plate for movement between a rest position free of said turntable and overhanging beyond the edge of said cabinet, and a playing position in which it tracks said record disc;
and means, permanently affixed to said tone arm, for releasably securing said tone arm to said spindle in a position within the confines of said cabinet top and clear of said turntable.

References Cited by the Examiner

UNITED STATES PATENTS

| | | | |
|---|---|---|---|
| 1,245,568 | 11/1917 | Collins | 274—39 |
| 1,502,060 | 7/1924 | Sachs | 274—1.7 |
| 1,915,906 | 6/1933 | Thomas | 274—1 |
| 2,583,845 | 1/1952 | Holik | 274—1 |
| 3,122,372 | 2/1964 | Van Antwerp | 274—39 |

FOREIGN PATENTS

| | | |
|---|---|---|
| 580,339 | 3/1924 | France. |
| 1,251,682 | 3/1960 | France. |
| 331,242 | 6/1929 | Great Britain. |
| 112,037 | 10/1925 | Switzerland. |

NORTON ANSHER, *Primary Examiner.*

WILLIAM E. JACKSON, *Assistant Examiner.*